(12) United States Patent
Podolskiy

(10) Patent No.: US 11,330,848 B2
(45) Date of Patent: May 17, 2022

(54) PROTECTIVE SOCK PREVENTING FUNGAL TYPE INFECTIONS

(71) Applicant: Galina Podolskiy, Chicago, IL (US)

(72) Inventor: Galina Podolskiy, Chicago, IL (US)

(*) Notice: Subject to any disclaimer, the term of this patent is extended or adjusted under 35 U.S.C. 154(b) by 68 days.

(21) Appl. No.: 16/603,837

(22) PCT Filed: Apr. 11, 2018

(86) PCT No.: PCT/US2018/027123
§ 371 (c)(1),
(2) Date: Oct. 9, 2019

(87) PCT Pub. No.: WO2018/191386
PCT Pub. Date: Oct. 18, 2018

(65) Prior Publication Data
US 2020/0113248 A1    Apr. 16, 2020

Related U.S. Application Data

(60) Provisional application No. 62/485,582, filed on Apr. 14, 2017.

(51) Int. Cl.
*A41B 11/02* (2006.01)

(52) U.S. Cl.
CPC ........... *A41B 11/02* (2013.01); *A41B 2400/32* (2013.01); *A41B 2400/34* (2013.01); *B32B 2307/7145* (2013.01); *D10B 2401/022* (2013.01)

(58) Field of Classification Search
CPC .. A41B 11/02; A41B 2400/32; A41B 2400/34
See application file for complete search history.

(56) References Cited

U.S. PATENT DOCUMENTS

| | | | |
|---|---|---|---|
| 3,259,915 A * | 7/1966 | Dison | A41B 11/005 2/239 |
| 5,778,702 A | 7/1998 | Wrightenberry | |
| 6,602,811 B1 | 8/2003 | Rock et al. | |
| 6,723,428 B1 | 4/2004 | Foss et al. | |
| 9,452,214 B2 * | 9/2016 | Gao | B32B 5/024 |
| 2005/0120463 A1 | 6/2005 | Cacioppo | |
| 2006/0010931 A1 * | 1/2006 | Lynch | D04B 1/26 66/185 |
| 2009/0106879 A1 * | 4/2009 | Post | A41B 11/006 2/240 |
| 2010/0050321 A1 * | 3/2010 | Martini | A41B 11/02 2/239 |
| 2012/0227161 A1 | 9/2012 | Canci | |

OTHER PUBLICATIONS

International Search Report and Written Opinion of International Search Authority for International Application No. PCT/US18/27123; dated Jun. 28, 2018, pp. 1-13.
International Preliminary Report on Patentability from then International Search Authority for International Application No. PCT/US18/27123; dated Oct. 15, 2019, pp. 1-6.

(Continued)

*Primary Examiner* — F Griffin Hall
(74) *Attorney, Agent, or Firm* — McDonnell Boehnen Hulbert & Berghoff LLP

(57) ABSTRACT

The invention relates to a wearable garment and methods for preventing fungal type infections.

10 Claims, 10 Drawing Sheets

(56) References Cited

OTHER PUBLICATIONS

American Diabetes Association, "Economic Costs of Diabetes in the U.S. in 2012," Diabetes Care 36(4):1033-46 (2013).
Holzer et al., "Costs and duration of care for lower extremity ulcers in patients with diabetes," Clin Ther., 20(1):169-81 (1998).
Ramsey et al., "Incidence, outcomes, and cost of foot ulcers in patients with diabetes," Diabetes Care. 22(3):382-7 (1999).
Rice et al., "Burden of diabetic foot ulcers for medicare and private insurers," Diabetes Care, 37(3):651-8 (2014).

* cited by examiner

A

B.

PROTECTIVE SOCK PREVENTING FUNGAL TYPE INFECTIONS

RELATED APPLICATIONS

This application is a U.S. National Phase application under 35 U.S.C. § 371 of PCT/US2018/027123, filed Apr. 11, 2018, which claims priority from and the benefit of U.S. Provisional Application No. 62/485,582, filed on Apr. 14, 2017, the specifications of which are hereby incorporated by reference in their entireties.

BACKGROUND OF THE INVENTION

Field of the Invention

This disclosure relates to a wearable garment preventing fungal type infections comprising a sheath having an antifungal barrier positioned in contact with the sheath. In particular, the disclosure relates to a protective sock preventing fungal type infections in the toe and toenail portion.

Description of Related Art

Contradictory to popular belief, conventional socks do not provide an effective barrier to fungal type infections because traditional socks are vulnerable to absorbing sweat and moisture when enclosed in shoes, providing ideal conditions and channels for fungus to travel back and forth. The problem is that fungus, even when treated effectively (99% of the time), is recurrent. Traditional socks do not provide a solution to this problem because the most significant factor contributing to this high reoccurrence of fungus is contaminated environments. For example, a patient would be continuously re-infected with fungus regardless of effective treatment because the patient's shoes provide a contaminated environment through the absorbing and enclosing of sweat and moisture.

Treatment for toe nail fungus tends to last from 6 to 18 months or more, and involves highly expensive daily oral or topical medication. Patients do not want to, nor would it be reasonable to require patients to purchase multiple pairs of new shoes to lower the risk of contaminated environments during and throughout the already costly treatment. Therefore, effective treatments attempt to minimize hindrance of contaminated shoes by treating the shoes themselves with antifungal sprays. Realistically, this approach is greatly flawed because unless the fungus is completely killed or removed, the shoes stay infected because bacteria tends to quickly multiply in warm conditions such as, for example, a home with or without the host/patient present.

As such, it is apparent that a need exists for a protective garment that prevents toe/toenail fungus without the recurrence of such infections when exposed to contaminated environments such as wearing shoes before, during, throughout, or after medical treatment.

SUMMARY OF THE INVENTION

It is against the above background that the present invention provides certain advantages over the prior art.

Although this invention as disclosed herein is not limited to specific advantages or functionalities (such for example, socks comprising protective layer(s) enclosing the toe and/or toenail area to prevent fungal type infections), the invention provides a wearable garment, comprising:

(a) a sheath having a first end and a second end, wherein the sheath defines a cavity in a wearable position, wherein the sheath has an opening at the first end, and wherein the sheath comprises a first material; and (b) an antifungal barrier positioned at the second end of the sheath, wherein the antifungal barrier comprises a second material that is different than the first material.

In one aspect of the wearable garment disclosed herein, the first material comprises a breathable matrix, a cotton material, Polytetrafluoroethylene (PTFE), polyester, an elastic material, a textile material comprising cotton, polyester, polyvinyl chloride (PVC), keratin fibers, wool, spandex, tencel, acrylic, bamboo fiber, flax, lyocell, rayon, and cellulosic acetates, wool, an elastic polyurethane fiber, or a combination thereof.

In one aspect of the wearable garment disclosed herein, the first material further comprises a yarn comprising copper, copper oxide, silver, and/or silver oxide particles attached to the fibers thereof.

In one aspect of the wearable garment disclosed herein, the second material comprises silicone, neoprene, fluoroelastomer, fluorosilicone, plastisol inks, a gel, a polymer, a polyurethane foam, a plastic, a polyurethane, a liquid or sprayable rubber, or a combination thereof.

In one aspect of the wearable garment disclosed herein, the second end of the sheath is closed such that the sheath is configured to cover the toes of a user.

In one aspect of the wearable garment disclosed herein, the antifungal barrier is positioned to contact an interior surface of the sheath.

In one aspect of the wearable garment disclosed herein, the antifungal barrier is positioned to contact an exterior surface of the sheath.

In one aspect of the wearable garment disclosed herein, the antifungal barrier is removably coupled to the first material.

In one aspect of the wearable garment disclosed herein, the antifungal barrier includes a plurality of hooks configured to removably couple with a plurality of loops on the first material.

In one aspect, the wearable garment disclosed herein further comprises one or more of an elastic band and stretchable stitching surrounding the opening.

In one aspect of the wearable garment disclosed herein, the antifungal barrier comprises a toe cap configured to cover the toes of the user.

In one aspect of the wearable garment disclosed herein, the antifungal barrier is infused with an antifungal medication.

In one aspect of the wearable garment disclosed herein, the antifungal barrier is infused with a moisturizing medication.

In one aspect of the wearable garment disclosed herein, the first material has an elastic property such that the sheath is configured to expand to receive an appendage of the user, and thereafter retract to conform to the appendage to thereby hold the wearable garment in place on the appendage.

In one aspect of the wearable garment disclosed herein, the antifungal barrier is waterproof.

In one aspect of the wearable garment disclosed herein, the second end of the sheath has a second opening, and wherein the antifungal barrier is coupled to the edges of the second opening to thereby close the wearable garment around the toes of a user.

In one aspect of the wearable garment disclosed herein, the sheath includes a compressive band positioned between the antifungal barrier and the first end of the sheath.

In one aspect of the wearable garment disclosed herein, an interior surface of the sheath includes a heel region comprising silicone, neoprene, fluoroelastomer, fluorosilicone, plastisol inks, a gel, a polymer, a polyurethane foam, a plastic, a polyurethane, a liquid or sprayable rubber, or a combination thereof, and wherein the heel region is configured to prevent the wearable garment from slipping.

In one aspect of the wearable garment disclosed herein, the antifungal barrier comprises a heel cap configured to cover a heel of a user.

In one aspect of the wearable garment disclosed herein, the antifungal barrier comprises an arch support configured to cover an arch of a foot of a user.

In one aspect of the wearable garment disclosed herein, the antifungal barrier comprises a silicone material, and wherein the antifungal barrier further provides shock absorption while the wearable garment is in use, thereby providing wound, calluses, and or neuroma prevention over bony prominences of the foot to help prevent medical conditions including blisters, calluses, bunions, hammer toes, mallet toes, fat pad atrophy over the metatarsal heads in the ball of the foot, and/or wounds.

The invention also provides a method of preventing fungus transfer to a user, the method comprising positioning the wearable garment disclosed herein on a foot of the user.

The invention also provides a system for preventing fungal transfer to a user, the system comprising the wearable garment disclosed herein.

The invention also provides a system for preventing fungal transfer to a user, the system comprising:
  (a) a wearable garment including a sheath having a first end and a second end, wherein the sheath defines a cavity in a wearable position, wherein the sheath has an opening at the first end, and wherein the sheath comprises a first material; and
  (b) an antifungal barrier positioned at the second end of the sheath, wherein the antifungal barrier comprises a second material that is different than the first material.

The invention also provides a sock for preventing fungus transfer to a user, the sock comprising:
  (a) a sheath having a first end and a second end, wherein the sheath defines a cavity in a wearable position, wherein the sheath has an opening at the first end and the second end of the sheath is closed such that the sheath is configured to cover the toes of the user in the wearable position, and wherein the sheath comprises a first layer positioned on an exterior surface of the sheath and a second layer positioned on an interior surface of the sheath; and
  (b) an antifungal barrier positioned at the second end of the sheath between the first layer and the second layer of the sheath.

In one aspect of the sock disclosed herein, the first layer and the second layer both comprise the same material, and wherein the antifungal barrier comprises a material that is different than the material of the first and second layers of the sheath.

In one aspect of the sock disclosed herein, the first layer and the second layer comprise different materials.

In one aspect of the sock disclosed herein, the material of the second layer includes cotton, elastin, and is further copper or silver infused.

In one aspect of the sock disclosed herein, each of the first layer and the second layer have a first end and a second end, and wherein the first end of the first layer is coupled to the first end of the second layer to thereby form the opening at the first end of the sheath.

The invention also provides a method comprising wearing the sock disclosed herein.

These and other features and advantages of the present invention will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Figure 1:
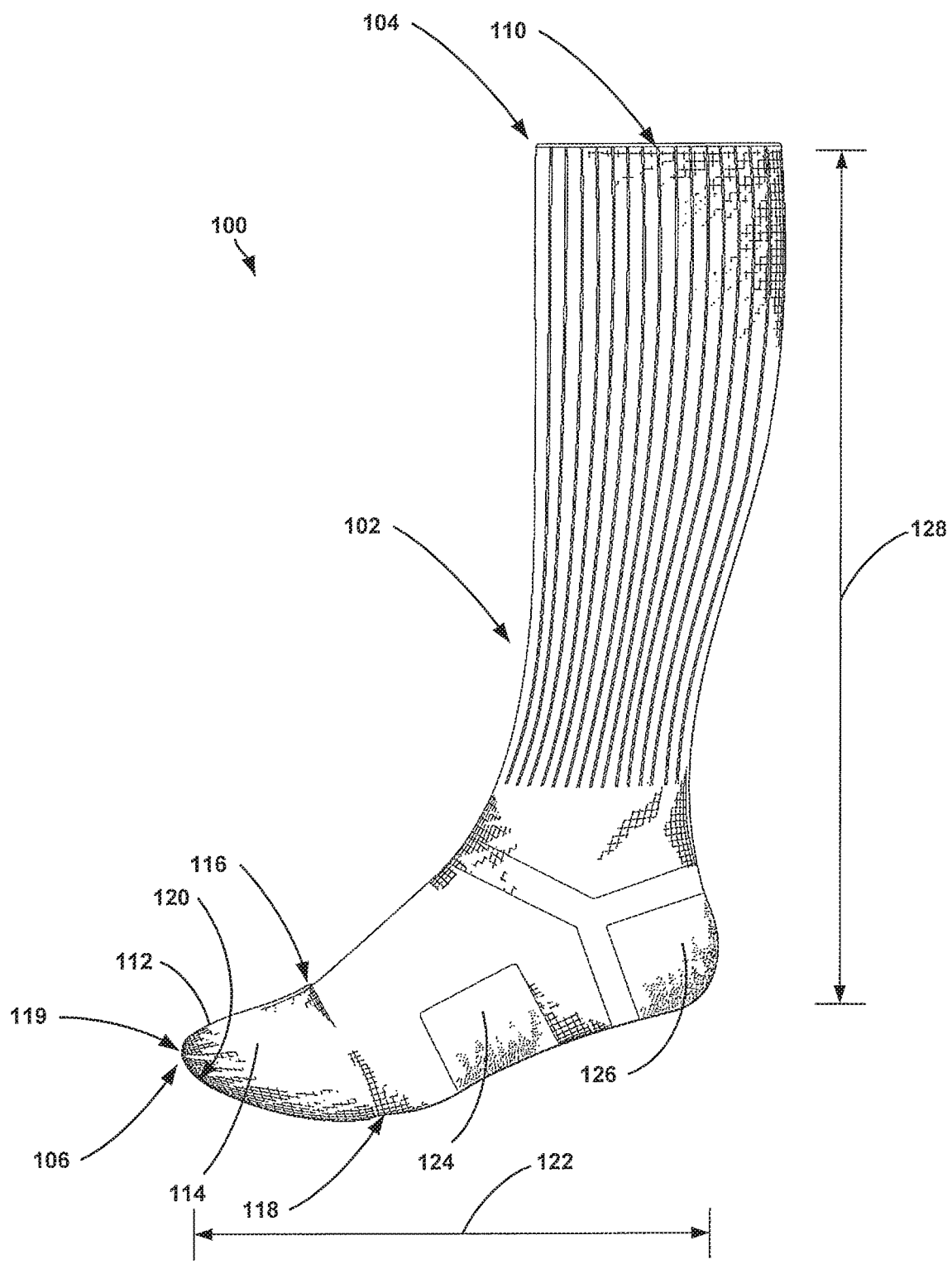
FIG. 1 shows a side view of a wearable garment, as described in Examples 1, 2, and 8.

Skilled artisans will appreciate that elements in the Figures are illustrated for simplicity and clarity and have not necessarily been drawn to scale. For example, the dimensions of some of the elements in the Figures can be exaggerated relative to other elements to help improve understanding of the embodiment(s) of the present invention.

DETAILED DESCRIPTION OF THE INVENTION

Exemplary wearable garments, systems, socks, and methods of use are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments can include more or less of each element shown in a given Figure. Further, some of the illustrated elements can be combined or omitted. Yet further, an exemplary embodiment can include elements that are not illustrated in the Figures.

All publications, patents and patent applications cited herein are hereby expressly incorporated by reference for all purposes.

Before describing the present invention in detail, a number of terms will be defined. As used herein, the singular forms "a," "an," and "the" include plural referents unless the context clearly dictates otherwise. For example, reference to a "nucleic acid" means one or more nucleic acids.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

As used herein, with respect to measurements, "about" means +/−5%.

As used herein, the term "fungus" and "fungal species" can be used interchangeably to refer to the following fungal species, including but not limited to, *Trichophyton rubrum, Trichophyton interdigitale, Epidermophyton floccosum, Trichophyton violaceum, Microsporum gypseum, Trichophyton tonsurans*, and *Trichophyton soudanense*.

As used herein, the term "fungal infection" refers to the following fungal infections, including but not limited to, interdigital tinea pedis, moccasin tinea pedis and vesiculobullous, tinea pedis.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

Considering that at least 10 percent of Americans have toe fungus, the health care system could be saving between $18 million and $90 million by using preventive measures, such as the wearable garment described herein. See e.g., American Diabetes Association. 2013. Economic costs of diabetes in the U.S. in 2012. Diabetes Care 36 (4):1033-46; Rice, J. B., U. Desai, and A. K. Cumming et at, 2014. Burden of diabetic foot ulcers for Medicare and private insurers. Diabetes Care 37 (3):651-8: Ramsey, S. D., K. Newton, and D. Blough et al., 1999. Incident, outcomes, and cost of foot ulcers in patients with diabetes. Diabetes Care 22 (3):382-7; Holzer, S. E., A. Camerota, and L. Martens et al., 1998. Cost and duration of care for lower extremity ulcers in patients with diabetes. Clinical Therapeutics 20 (1):169-81.

The FDA recently approved two new prescription medications to treat nail fungus. These topical liquids are shockingly expensive.

One little bottle of Jublia (efinaconazole) contains 4 milliliters (ml). That's less than a teaspoon, which contains 5 ml. The cost at a giant chain drugstore is $539. A competitor, Kerydin (tavaborole), costs about the same—$531 for 4 ml.

Jublia should be used on those bad nails every day for 48 weeks. That means you'll need 16 of those little bottles for a complete treatment, bringing the total to $8,624 per each patient, each treatment.

Ulcer care adds around US $9 billion to $13 billion to the direct yearly costs associated with diabetes itself, according to a new study examining the annual, per-patient burden of diabetic foot ulcers, published in the March issue of Diabetes Care.

A comparison of time spent in public vs private healthcare showed that those patients with diabetic foot ulcers experienced more days hospitalized (+138.2% Medicare, +173.5% private), more days requiring home healthcare (+85.4% Medicare, +230.0% private), more emergency-department visits (+40.6% Medicare, +109.0% private), and more outpatient/physician-office visits (+35.1% Medicare, +42.5% private) than matched controls.

Of those with diabetic foot ulcers, 3.8% of Medicare and 5.0% of privately insured patients underwent lower-limb amputations in the study.

On an individual wound basis, mean Medicare spending per wound was $3,415 to $3,859. The most expensive wounds per beneficiary were arterial ulcers ($9,105 to $9,418), followed by pressure caused injuries ($3,696 to $4,436). The annual cost of diabetes is tremendously expensive; according to the American Diabetes Association, it was $245 billion in 2012.

These costs can, in turn, be divided into those associated with treatment of the disease itself, those associated with chronic complications of diabetes, and those native to O&P professional interests: foot ulcers are a major cause of hospitalizations and additional healthcare expenditures in this population and have been linked with a three-year cumulative mortality rate of 28 percent. Relative costs of care for patients with diabetes who have lower-limb ulcers were 1.5 to 2.4 times higher than for those with diabetes who did not have an ulcer in the year prior to the ulcer incident recorded for this study.

Foot ulcers represent a substantial cost burden among Medicare beneficiaries with diabetes, with Rice et al. suggesting a one-year cost of just over $9 billion. Understanding the true cost of a foot ulcer is a challenging enterprise as those individuals at the greatest risk for ulceration are generally sicker individuals with greater healthcare utilization costs prior to the development of the ulcer itself.

More than 60% of nontraumatic lower limb amputations occur in diabetic individuals, and at least 80% of amputations are preceded by an ulcer.

Given the extreme costs associated with treating this condition, screening and prevention are more justifiably pursued, both for patients' well-being and the containment of their associated medical bills.

In view of the cost and long treatment time associated with fungal infections, the present invention relates to a wearable garment to prevent fungus transfer to the user. More particularly, the wearable garment prevents fungal type infections by covering a desired area with protective layers that act as antifungal contamination barriers. Specifically, the antifungal barriers impede causes of fungal contamination such as sweat, grease, warmth, moisture, or other sources of bacteria such as irritation and injuries (wounds, cuts, scars, etc.). In one particular example, the wearable garment comprises a sock with the antifungal barrier embedded therein. In such an example, the sock and antifungal barrier together are thin enough to enable the sock to be worn while wearing dress shoes or other similar type footwear. In another example, the wearable garment comprises other clothing configured to cover warm moist body parts vulnerable to fungal type infections. Examples of such clothing include gloves, t-shirts, or undergarments.

The wearable garment described herein can be used in a variety of circumstances to prevent fungus transfer from to the user. For example, one objective of the present disclosure pertains to fully stopping or significantly minimizing the occurrence of fungal re-infection. Another objective of the present disclosure is to prevent the spreading of new contamination from wearing already infected shoes, which is common amongst previously used or owned shoes. In the case where the wearable garment is a sock, the sock allows patients to wear the sock in combination with their dress shoes or other similar footwear. As such, the sock prevents fungal infection and re-infection without adding a drastic change to the user's lifestyle or comfort, as the user can simply wear the sock in combination with their normal shoes and go about their day. Further, the design of the wearable garment enables a user to wear the wearable garment for daily use.

In one particular example, the wearable garment comprises a sock. The sock includes a sheath having a first end and a second end. The first end includes an opening through which a user can insert their foot when the sock is in use. The second end of the sheath is closed such that the sheath is configured to cover the toes of a user when in use. The sock also includes an antifungal barrier positioned at the second end of the sheath to thereby cover the toes of the user. The sheath can comprise a first material, the antifungal barrier can comprise a second material that is different than the first material. In particular, the antifungal barrier can comprise a thin protective layer of silicone and/or gel covering a desired area of the toes of the user. More specifically, the thin layer(s) of silicone and/or gel would provide an antifungal barrier against the shoes the user can wear. The protective silicone and/or gel layer(s) would be washable in color safe chlorine wash enabling continued use of the sock. Additionally, the protective silicone and/or gel layer(s) can be infused with antifungal medicated or natural remedies such as tea tree oil, to further prevent fungus transfer from the sock to the user. Along with the protective layer(s) being waterproof and a complete barrier between toes and shoes, this optional remedy infusion feature provides a moisturizing and anti-fungal therapeutic effect to dry skin. In one particular example, the sheath includes a first layer positioned on an exterior surface of the sheath and a second layer positioned on an interior surface of the sheath. In such an example, the antifungal barrier is positioned at the second end of the sheath between the first layer and the second layer of the sheath.

In addition to the anti-bacterial and anti-fungal properties of the protective silicone and/or gel layer(s) described above, the protective silicone and/or gel layer(s) can also provide other benefits to the user. In particular, the protective silicone and/or gel layer(s) provide shock absorption while the sock is in use, thereby providing wound, calluses, and or neuroma prevention over bony prominences of the foot to help prevent medical conditions including blisters, calluses, bunions, hammer toes, mallet toes, fat pad atrophy over the metatarsal heads in the ball of the foot, and/or wounds. These medical conditions can cause significant discomfort on ambulation and walking in shoes or without, in all types of patient population. In particular, these medical conditions in diabetics can cause severe morbidity such as ulceration and blistering over pressure points with or without previous callus formation, and high chance of potential foot amputation, as a diabetic foot loses protective sensation and wound healing due to poor circulation and high blood sugar is extremely difficult and costly to treat. As such, the silicone and/or gel layer(s) not only protects from cross contamination in the shoe, but provides a shock absorption and friction eliminating effect in the shoe, as well as a fungal and bacterial contamination barrier.

Up to 25% of people with diabetes will develop a foot ulcer at some point during their lifetime, and 1 in 5 will require an amputation. In 2006, more than 65,700 lower-limb amputations were performed in the United States alone in people with diabetes, and the 5-year mortality rate following an amputation is worse than for most malignancies. In general, foot ulcers in people with diabetes result from repetitive moderate stress encountered by the insensate foot during ambulation. The silicone antifungal barrier 112 of the wearable garment 100 of the instant invention (see e.g., FIG. 1) is capable of actin as a shock absorber for the foot to ease pain and reduce pressure. Simply slip foot shock absorbers over toes to cushion the ball of the foot.

In addition to standard materials such as natural rubber and urethane, a variety of silicone gels can serve the purpose of shock absorption for prevention of foot ulceration, as well as a fungal and bacterial contamination barrier. The unique properties of silicone gel include stable performance over a wide temperature range, good thermal conductivity, high ozone UV and chemical resistance, and excellent for light-load and low-frequency applications.

Soft silicone has been approved for use in wound management by regulatory bodies around the world. Published studies suggest that patients whose wounds are dressed with soft silicone dressings experience less trauma, less discomfort on removal and less maceration than those dressed with conventional dressings, thus reducing treatment costs.

As mentioned above, the evidence base to support the use of offloading is largest for the treatment of foot ulcers. The evidence base for ulcer prevention is limited and inconsistent. In fact, for primary prevention, it is non-existent. High ulcer recurrence rates are still found in diabetes and show that we are ineffective in keeping ulcers healed.

Different reasons may explain why it is so difficult to prevent ulcer recurrence. In many cases, patients do not sense they have a foot problem due to the existing peripheral neuropathy. Further, the precipitating factors that caused the previous ulcer (i.e., neuropathy, deformity, high pressure and patient behavior) are not removed. Further, visits to the specialized clinic or health care professional are less frequent than during ulcer treatment, sometimes even absent. In addition, transition from an offloading device for healing to footwear for prevention inevitably increases plantar pressure. Further, patients wear footwear which is removable, so adherence to prescribed treatment can be a problem. As such, a larger focus should be put on the prevention of foot ulcers, in particular on assessing the efficacy of therapeutic footwear and its relative role in comparison with other preventative strategies.

The antifungal barrier 112 of the wearable garment 100 of the instant invention (see e.g., FIG. 1) is capable of not only protecting from cross contamination in the shoe, but provides a shock absorption and friction eliminating effect in the shoe to prevent such foot ulcers, as well as a fungal and bacterial contamination barrier.

The invention will be further described in the following examples, which do not limit the scope of the invention described in the claims.

EXAMPLES

The Examples that follow are illustrative of specific embodiments of the invention, and various uses thereof. They are set forth for explanatory purposes only, and are not to be taken as limiting the invention.

Example 1

Wearable Garment

Figure 2:
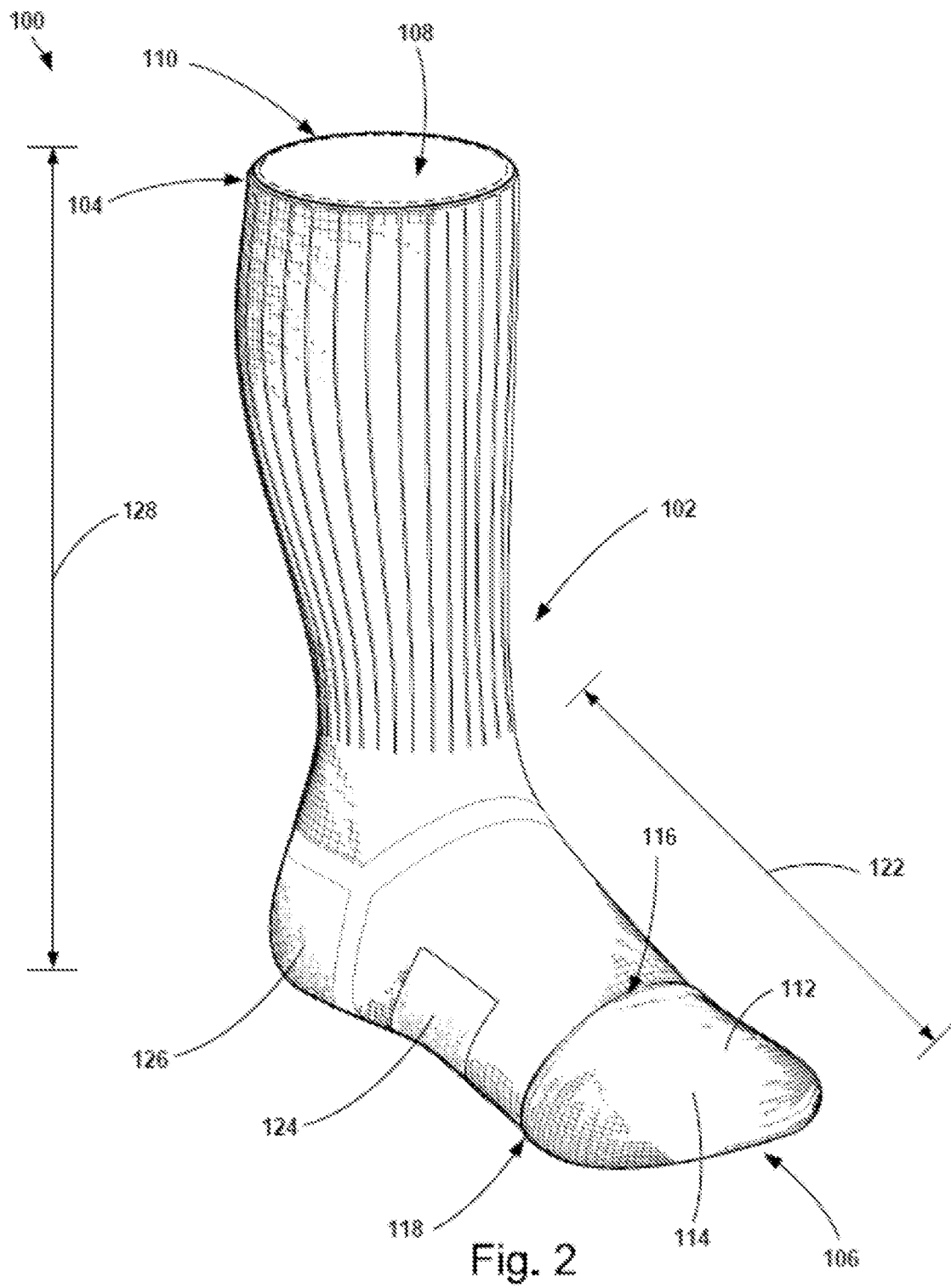
FIG. 2 shows a perspective view of a wearable garment, as described in Examples 1, 2, and 8.

In one embodiment of the invention, FIGS. 1-2 illustrates a wearable garment 100. As used herein, "wearable garment" includes, but is not limited to, a sock (as shown in FIGS. 1-2), a glove, a t-shirt, undergarments, or pants, as non-limiting examples. The wearable garment 100 of FIGS. 1-2 includes a sheath 102 having a first end 104 and a second 106. The sheath 102 defines a cavity 108 in a wearable position. The cavity 108 comprises a tubular channel into which a user can insert their foot. The sheath 102 has an opening 110 at the first end 104, and the sheath 102 comprises a first material. The wearable garment 100 can include one or more of an elastic band and stretchable stitching surrounding the opening 110 to prevent the wearable garment 100 from sliding down the leg of the user when in use. The wearable garment 100 also includes an antifungal barrier 112 positioned at the second end 106 of the sheath 102. The antifungal barrier 112 comprises a second material that is different than the first material. As used herein, a first material is different than a second material if they are unlike in nature, form, or quality. As such, since the material of the antifungal barrier 112 is different than the material of the sheath 102, the antifungal barrier 112 has different physical properties from the sheath 102.

In one example, the first material of the sheath 102 can be, for example but not limited to, a breathable matrix, a cotton material, Polytetrafluoroethylene (PTFE), polyester, an elastic material, a textile material, other materials, or a combination thereof. The textile material can be, for example but not limited to, cotton, polyester, polyvinyl chloride (PVC), keratin fibers, wool, spandex, tencel, acrylic, bamboo fiber, flax, lyocell, rayon, cellulosic acetates, wool, and/or an elastic polyurethane fiber.

In one example, the first material can further comprise a yarn comprising copper, copper oxide, silver, and/or silver oxide particles attached to the fibers thereof. The first material can further include an anti-bacterial and/or anti-fungal material contained in the first material. The anti-bacterial and/or anti-fungal material can be, for example but not limited to, ceramic magnetic powder, silver-ion, zinc-ion, potassium-ion copper-oxide, calcium-ion, titanium-di-oxide, triclosan, chloroxylenol, chitosan and quaternary ammonium compounds. Even if the first material does not have antifungal properties, the antifungal barrier 112 positioned at the second end 106 of the sheath 102 with prevent the transfer of fungus. The yarn comprising copper, copper oxide, silver, and/or silver oxide particles attached to the fibers of the first material and/or the anti-bacterial and/or anti-fungal material contained in the first material provides a further benefit by inhibiting fungal growth, controlling moisture (which further controlling fungal environment), and further preventing fungal transfer. However, such yarn is not required for the wearable garment 100 to prevent transfer of fungus from the wearable garment to the user.

The first material can include, for example but not limited to, cotton, polyester, polyvinyl chloride (PVC), keratin fibers, wool, Spandex™, Tencel, acrylic, bamboo fiber, flax, lyocell, rayon, cellulosic acetates and/or COOLMAX™. Cellulosic fibers and synthetic fibers are suitable materials for the wearable garment 100. As discussed above, anti-bacterial and/or anti-fungal materials such as ceramic magnetic powder, silver-ion, zinc-ion, potassium-ion copper-oxide, calcium-ion, titanium-dioxide, triclosan, chloroxylenol, chitosan and/or quaternary ammonium compounds can also be incorporated with the first material for reducing bad odor and eliminating bacteria and fungus. The first material can be woven or knitted to form the a wearable garment 100 to ensure good breathability. One construction design for the wearable garment 100 is a toe sock. In a toe sock, each individual toe is individually encased by the first material, and this would increase contact surface area for the antifungal barrier 112 and the skin of the foot. These features provide good moisture management which is an important element for successfully treating the fungal infection. Moisture management of socks is different from that of sportswear or active wear as the environment is occlusive. Moisture management reduces microbial overgrowth for patients.

The first material can further have an elastic property such that the sheath 102 is configured to expand to receive an appendage of a user (such as a foot), and thereafter retract to conform to the appendage to thereby hold the wearable garment 100 in place on the appendage.

The second material comprises silicone, neoprene, fluoroelastomer, fluorosilicone, plastisol inks, a gel, a polymer, a polyurethane foam, plastic, polyurethane, a liquid or sprayable rubber, or a combination thereof. The second material can be selected such that the antifungal barrier 112 is waterproof.

As shown in FIGS. 1-2, the second end 106 of the sheath 102 can be closed such that the sheath 102 is configured to cover the toes of a user when the wearable garment 100 is in use. In such an example, the antifungal barrier 112 covers a desired portion of a toe section 114 of the sheath 102, with the desired portion fixed by an antifungal barrier top surface end 116 and bottom surface end 118. The antifungal barrier 112 further comprises an antifungal barrier outer surface 119 and inner surface 120 forming to the toe section 114.

In one example, the antifungal barrier 112 is positioned on an interior surface of the sheath 102, such that the antifungal barrier outer surface 119 layers against the inner surface of the sheath 102 with the antifungal barrier inner surface 120 layering against a patient's toes/toenails. In another example, the antifungal barrier 112 is positioned on an exterior surface of the sheath such that the antifungal barrier outer surface 119 layers against the patient's shoes with the antifungal barrier inner surface 120 layering against the outer surface of the sheath 102.

FIGS. 1-2 further illustrates the traditional structures of a sock such as a foot section 122, a sole section 124, a heel section 126, a leg section 128, and the opening 110. In one embodiment, the antifungal barrier 112 forms to the toe section 114 connecting to the foot section 122 which comprises the sole section 124 and the heel section 126 connecting to the leg section 128 that provides the opening 110 enabling the insertion of a foot. The foot section 122 can range in length from about 22 cm to about 28 cm, and the leg section 128 can range in length from about 3 cm to about 38 cm.

In addition to the anti-bacterial and anti-fungal properties of the antifungal barrier 112 described above, the antifungal barrier 112 can also provide other benefits to the user. In particular, the antifungal barrier 112 provide shock absorption while the wearable garment 100 is in use, thereby providing wound, calluses, and or neuroma prevention over bony prominences of the foot to help prevent medical conditions including blisters, calluses, bunions, hammer toes, mallet toes, fat pad atrophy over the metatarsal heads in the ball of the foot, and/or wounds. These medical conditions can cause significant discomfort on ambulation and walking in shoes or without, in all types of patient population. In particular, these medical conditions in diabetics can cause severe morbidity such as ulceration and blistering over pressure points with or without previous callus formation, and high chance of potential foot amputation, as a diabetic foot looses protective sensation and wound healing due to poor circulation and high blood sugar is extremely difficult and costly to treat. As such, the antifungal barrier 112 not only protects from cross contamination in the shoe, but provides a shock absorption and friction eliminating effect in the shoe, as well as a fungal and bacterial contamination barrier.

The silicone antifungal barrier 112 of the wearable garment 100 of the instant invention (see e.g., FIGS. 1-2) can act as a shock absorber for the foot to ease pain and reduce pressure. Simply slip foot shock absorbers over toes to cushion the ball of the foot.

In addition to standard materials such as natural rubber and urethane, a variety of silicone gels can serve the purpose of shock absorption for prevention of foot ulceration, as well as a fungal and bacterial contamination barrier. The unique properties of silicone gel include stable performance over a wide temperature range, good thermal conductivity, high ozone UV and chemical resistance, and excellent for light-load and low-frequency applications.

Soft silicone has been approved for use in wound management by regulatory bodies around the world. Published studies suggest that patients whose wounds are dressed with soft silicone dressings experience less trauma, less discomfort on removal and less maceration than those dressed with conventional dressings, thus reducing treatment costs.

Furthermore, the antifungal barrier 112 of the wearable garment 100 of the instant invention (see e.g., FIGS. 1-2) not only protects from cross contamination in the shoe, but provides a shock absorption and friction eliminating effect in the shoe to prevent such foot ulcers, as well as a fungal and bacterial contamination barrier.

Example 2

Wearable Garment Where the Antifungal Barrier Comprises a Toe Cap

In Example 1, the sheath 102 is closed at the second end 106, such that the sheath 102 is configured to cover the toes of a user. In an alternative embodiment, with reference to FIGS. 1-2, the antifungal barrier 112 replaces the toe section 114 to directly connect adjacently to the foot section 122. In this embodiment, the excess sheath material covering the desired area of protection is completely eliminated. Instead, the antifungal barrier outer surface 119 layers directly against the user's shoes with the antifungal barrier inner surface 120 directly layering against a user's toes/toenails. In such an example, the second end 106 of the sheath has a second opening, and the antifungal barrier 112 is coupled to the edges of the second opening to thereby close the wearable garment around the toes of a user. Thereby, the antifungal barrier 112 connects directly to the foot section 122 which comprises the sole section 124 and the heel section 126 connecting to the leg section 128 that provides the opening 110 enabling the insertion of a foot.

Example 3

Wearable Garment Where the Antifungal Barrier Includes an Infused Substance

Figure 3:
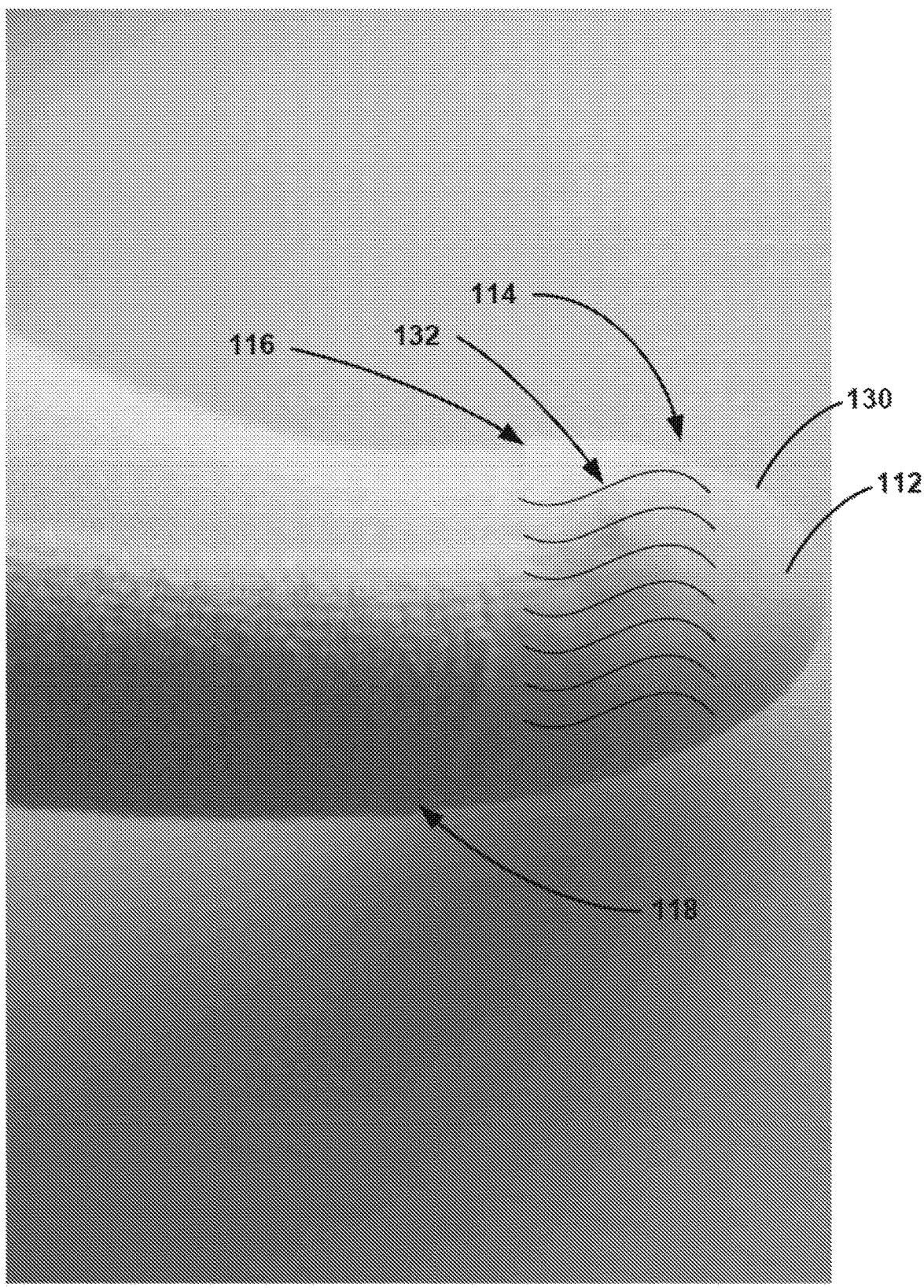
FIG. 3 shows a side view of a wearable garment, as described in Examples 3, 8, and 9.

In another embodiment of the invention, FIG. 3 shows that the antifungal barrier 112 can be a silicone layer 130 that acts as a protective layer. The silicone layer 130 can be positioned as the antifungal barrier 112 in any of the embodiments described above in Examples 1 and 2. In one form, the silicone layer 130 integrates and embeds an infused antifungal remedy 132, either medicated or natural. In one particular example, the antifungal barrier 112 is infused with an infused substance 132. As used herein, the antifungal barrier is "infused" with the infused substance 132 when the antifungal barrier 112 is soaked in the infused substance 132 to thereby extract the properties of the infused substance 132. In one example, the infused substance 132 can comprise an antifungal medication, such as for example but not limited to, tea tree oil, and eucalyptus oil as examples. In addition to providing anti-bacterial and/or anti-fungal effect, the antifungal medication can provide a pleasant smell effect. In another example, the infused substance 132 can comprise an oil infused silicone (e.g., tea tree oils and eucalyptus oils) that provide a moisturizing and antifungal therapeutic effect to dry skin. In another embodiment, the antifungal barrier 112 provides a moisturizing and antifungal therapeutic effect to dry skin simply due to the silicone material of the antifungal barrier 112.

Example 4

Wearable Garment Where the Antifungal Barrier is Removably Coupled to the Sheath In another embodiment of the invention, the antifungal barrier 112 is removably coupled to the first material of the sheath 102. As used herein, "removably coupled" means that a user can remove the antifungal barrier 112 from the sheath if they so desire. In one particular example, the antifungal barrier 112 can include a plurality of hooks configured to removably couple with a plurality of loops on the first material (e.g., the antifungal barrier 112 includes Velcro®). In another example, the antifungal barrier 112 includes an inferior glue configured to stick to the sheath 102 when in use, but allows a user to easily remove the antifungal barrier from contact with the sheath 102 if the user so desires. Such an arrangement can enable a user to turn any sock into an antifungal sock by placing the antifungal barrier 112 in the toe section of the sock. As such, the removably coupled antifungal barrier 112 can be used in any of the embodiments described above in Examples 1-4.

Example 5

Wearable Garment with a Compressive Band

In another embodiment of the invention, the sheath 102 includes a compressive band 136 positioned between the antifungal barrier 112 and the first end 104 of the sheath 102. Such a compressive band 136 can be used in any of the embodiments described above in Examples 1-4. In particular, the compressive band 136 can comprise compressive support at the arch of the foot. The compressive band 136 can be positioned between the toe section 114 and the heel section 126. The compressive band 136 can be about 5 cm in length. The compressive band 136 can help ensure a non-slip effect when the wearable garment 100 is in use.

Example 6

Wearable Garment with a Non-Slip Heel Region

In another embodiment of the invention, an interior surface of the sheath 102 includes a heel region 138 comprising silicone, neoprene, fluoroelastomer, fluorosilicone, plastisol inks, a gel, a polymer, a polyurethane foam, plastic, polyurethane, a liquid or sprayable rubber, or a combination thereof. In such an example, the heel region 138 is positioned in the heel portion 126 and is configured to prevent the wearable garment 100 from slipping when in use. Such a heel region 138 can be used in any of the embodiments described above in Examples 15.

Example 7

Wearable Garment with the Antifungal Barrier Positioned in Various Locations

In another embodiment of the invention, the antifungal barrier 112 comprises a heel cap configured to cover a heel of a user. Such an antifungal barrier 112 can replace the antifungal barrier 112 described above in relation to FIGS. 1-3 and Examples 1-6, or the heel cap antifungal barrier can be in addition to the antifungal barrier 112 positioned over the toes of the user. In another embodiment of the invention, the antifungal barrier 112 comprises an arch support configured to cover an arch of a foot of a user. Such an antifungal barrier can replace the antifungal barrier 112 described above in relation to FIGS. 1-3 and Examples 1-6, or the arch support antifungal barrier can be in addition to the antifungal barrier 112 positioned over the toes of the user and/or the antifungal barrier positioned over the heel of the user.

Example 8

System for Preventing Fungus Transfer to a User

In another embodiment of the invention, the present disclosure provides a system comprising a wearable garment 100 for preventing fungus transfer to a user. The wearable garment 100 of the system can include any of the embodiments described above in relation to Examples 1-7. In particular, the wearable garment 100 can include a sheath 102 having a first end 104 and a second end 106. The sheath defines a cavity 108 in a wearable position, and the sheath has an opening 110 at the first end. The system also includes an antifungal barrier 112 positioned at the second end 106 of the sheath 102. The sheath 102 comprises a first material, and the antifungal barrier 112 comprises a second material that is different than the first material.

In one example, the first material of the sheath 102 can be, for example but not limited to, a breathable matrix, a cotton material, Polytetrafluoroethylene (PTFE), polyester, an elastic material, a textile material, other materials, or a combination thereof. The textile material can be, for example but not limited to, cotton, polyester, polyvinyl chloride (PVC), keratin fibers, wool, spandex, tencel, acrylic, bamboo fiber, flax, lyocell, rayon, cellulosic acetates, wool, and/or an elastic polyurethane fiber.

In one example, the first material can further comprise a yarn comprising copper, copper oxide, silver, and/or silver oxide particles attached to the fibers thereof. The first material can further include an anti-bacterial and/or anti-fungal material contained in the first material. The anti-bacterial and/or anti-fungal material can be, for example but not limited to, ceramic magnetic powder, silver-ion, zinc-ion, potassium-ion copper-oxide, calcium-ion, titanium-dioxide, triclosan, chloroxylenol, chitosan and quaternary ammonium compounds. Even if the first material does not have antifungal properties, the antifungal barrier 112 positioned at the second end 106 of the sheath 102 will prevent the transfer of fungus. The yarn comprising copper, copper oxide, silver, and/or silver oxide particles attached to the fibers of the first material and/or the anti-bacterial and/or anti-fungal material contained in the first material provides a further benefit by inhibiting fungal growth, controlling moisture (which further controlling fungal environment), and further preventing fungal transfer. However, such yarn is not required for the wearable garment 100 to prevent transfer of fungus from the wearable garment to the user.

The first material can include cotton, polyester, polyvinyl chloride (PVC), keratin fibers, wool, Spandex™, Tencel, acrylic, bamboo fiber, flax, lyocell, rayon, cellulosic acetates and COOLMAX™. Cellulosic fibers and synthetic fibers are suitable materials for the wearable garment 100. As discussed above, anti-bacterial and/or anti-fungal materials such as ceramic magnetic powder, silver-ion, zinc-ion, potassium-ion copper-oxide, calcium-ion, titanium-dioxide, triclosan, chloroxylenol, chitosan and/or quaternary ammonium compounds can also be incorporated with the first material for reducing bad odor and eliminating bacteria and fungus. The first material can be woven or knitted to form the a wearable garment 100 to ensure good breathability. One construction design for the wearable garment 100 is a toe sock. In a toe sock, each individual toe is individually encased by the first material, and this would increase contact surface area for the antifungal barrier 112 and the skin of the foot. These features provide good moisture management which is an important element for successfully treating the fungal infection. Moisture management of socks is different from that of sportswear or active wear as the environment is occlusive. Moisture management reduces microbial overgrowth for patients.

The first material can further have an elastic property such that the sheath 102 is configured to expand to receive an appendage of a user (such as a foot), and thereafter retract to conform to the appendage to thereby hold the wearable garment 100 in place on the appendage.

The second material comprises silicone, neoprene, fluoroelastomer, fluorosilicone, plastisol inks, a gel, a polymer, a polyurethane foam, plastic, polyurethane, a liquid or sprayable rubber, or a combination thereof. The second material can be selected such that the antifungal barrier 112 is waterproof.

As shown in FIGS. 1-2, the second end 106 of the sheath 102 can be closed such that the sheath 102 is configured to cover the toes of a user when the wearable garment 100 is in use. In such an example, the antifungal barrier 112 covers a desired portion of a toe section 114 of the sheath 102, with the desired portion fixed by an antifungal barrier top surface end 116 and bottom surface end 118. The antifungal barrier 112 further comprises an antifungal barrier outer surface 119 and inner surface 120 forming to the toe section 114.

In one example, the antifungal barrier 112 is positioned on an interior surface of the sheath 102, such that the antifungal barrier outer surface 119 layers against the inner surface of the sheath 102 with the antifungal barrier inner surface 120 layering against a patient's toes/toenails. In another example, the antifungal barrier 112 is positioned on an exterior surface of the sheath such that the antifungal barrier outer surface 119 layers against the patient's shoes with the antifungal barrier inner surface 120 layering against the outer surface of the sheath 102.

FIGS. 1-2 further illustrates the traditional structures of a sock such as a foot section 122, a sole section 124, a heel section 126, a leg section 128, and the opening 110. In one embodiment, the antifungal barrier 112 forms to the toe section 114 connecting to the foot section 122 which comprises the sole section 124 and the heel section 126 connecting to the leg section 128 that provides the opening 110 enabling the insertion of a foot. The foot section 122 can range in length from about 22 cm to about 28 cm, and the leg section 128 can range in length from about 3 cm to about 38 cm.

In Example 1, the sheath 102 is closed at the second end 106, such that the sheath 102 is configured to cover the toes of a user. In an alternative embodiment, with reference to FIGS. 1-2, the antifungal barrier 112 replaces the toe section 114 to directly connect adjacently to the foot section 122. In this embodiment, the excess sheath material covering the desired area of protection is completely eliminated. Instead, the antifungal barrier outer surface 119 layers directly against the user's shoes with the antifungal barrier inner surface 120 directly layering against a user's toes/toenails. In such an example, the second end 106 of the sheath has a second opening, and the antifungal barrier 112 is coupled to the edges of the second opening to thereby close the wearable garment around the toes of a user. Thereby, the antifungal barrier 112 connects directly to the foot section 122 which comprises the sole section 124 and the heel section 126 connecting to the leg section 128 that provides the opening 110 enabling the insertion of a foot.

In another embodiment of the invention, FIG. 3 shows that the antifungal barrier 112 can be a silicone layer 130 that acts as a protective layer. The silicone layer 130 can be positioned as the antifungal barrier 112 in any of the embodiments described above in Examples 1 and 2. In one form, the silicone layer 130 integrates and embeds an infused antifungal remedy 132, either medicated or natural. In one particular example, the antifungal barrier 112 is infused with an infused substance 132. As used herein, the antifungal barrier is "infused" with the infused substance 132 when the antifungal barrier 112 is soaked in the infused substance 132 to thereby extract the properties of the infused substance 132. In one example, the infused substance 132 can comprise an antifungal medication, such as for example but not limited to, tea tree oil and eucalyptus oils as examples. In addition to providing anti-bacterial and/or anti-fungal effect, the antifungal medication can provide a pleasant smell effect. In another example, the infused substance 132 can comprise an oil infused silicone (e.g., tea tree oils and eucalyptus oils) that provide a moisturizing and antifungal therapeutic effect to dry skin. In another embodiment, the antifungal barrier 112 provides a moisturizing and antifungal therapeutic effect to dry skin simply due to the silicone material of the antifungal barrier 112.

In another embodiment of the invention, the antifungal barrier 112 is removably coupled to the first material of the sheath 102. As used herein, "removably coupled" means that a user can remove the antifungal barrier 112 from the sheath if they so desire. In one particular example, the antifungal barrier 112 can include a plurality of hooks configured to removably couple with a plurality of loops on the first material (e.g., the antifungal barrier 112 includes Velcro®). In another example, the antifungal barrier 112 includes an inferior glue configured to stick to the sheath 102 when in use, but allows a user to easily remove the antifungal barrier from contact with the sheath 102 if the user so desires. Such an arrangement can enable a user to turn any sock into an antifungal sock by placing the antifungal barrier 112 in the toe section of the sock. As such, the removably coupled antifungal barrier 112 can be used in any of the embodiments described above in Examples 1-3.

In another embodiment of the invention, the sheath 102 includes a compressive band 136 positioned between the antifungal barrier 112 and the first end 104 of the sheath 102. Such a compressive band 136 can be used in any of the embodiments described above in Examples 1-4. In particular, the compressive band 136 can comprise a compressive support at the arch of the foot. The compressive band 136 can be positioned between the toe section 114 and the heel section 126. The compressive band 136 can be about 5 cm in length. The compressive band 136 can help ensure a non-slip effect when the wearable garment 100 is in use.

In another embodiment of the invention, an interior surface of the sheath 102 includes a heel region 138 comprising silicone, neoprene, fluoroelastomer, fluorosilicone, plastisol inks, a gel, a polymer, a polyurethane foam, plastic, polyurethane, a liquid or sprayable rubber, or a combination thereof. In such an example, the heel region 138 is positioned in the heel portion 126 and is configured to prevent the wearable garment 100 from slipping when in use. Such a heel region 138 can be used in any of the embodiments described above in Examples 1-5.

In another embodiment of the invention, the antifungal barrier 112 comprises a heel cap configured to cover a heel of a user. Such an antifungal barrier 112 can replace the antifungal barrier 112 described above in relation to FIGS. 1-3 and Examples 1-6, or the heel cap antifungal barrier can be in addition to the antifungal barrier 112 positioned over the toes of the user. In another embodiment of the invention, the antifungal barrier 112 comprises an arch support configured to cover an arch of a foot of a user. Such an antifungal barrier can replace the antifungal barrier 112 described above in relation to FIGS. 1-3 and Examples 1-6, or the arch support antifungal barrier can be in addition to the antifungal barrier 112 positioned over the toes of the user and/or the antifungal barrier positioned over the heel of the user.

In addition to the anti-bacterial and anti-fungal properties of the antifungal barrier 112 described above, the antifungal barrier 112 can also provide other benefits to the user. In particular, the antifungal barrier 112 provide shock absorption while the wearable garment 100 is in use, thereby providing wound, calluses, and or neuroma prevention over bony prominences of the foot to help prevent medical conditions including blisters, calluses, bunions, hammer toes, mallet toes, fat pad atrophy over the metatarsal heads in the ball of the foot, and/or wounds. These medical conditions can cause significant discomfort on ambulation and walking in shoes or without, in all types of patient population. In particular, these medical conditions in diabetics can cause severe morbidity such as ulceration and blistering over pressure points with or without previous callus formation, and high chance of potential foot amputation, as a diabetic foot looses protective sensation and wound healing due to poor circulation and high blood sugar is extremely difficult and costly to treat. As such, the antifungal barrier 112 not only protects from cross contamination in the shoe, but provides a shock absorption and friction eliminating effect in the shoe, as well as a fungal and bacterial contamination barrier.

Example 9

Wearable Garment which is a Sock

Figure 4:
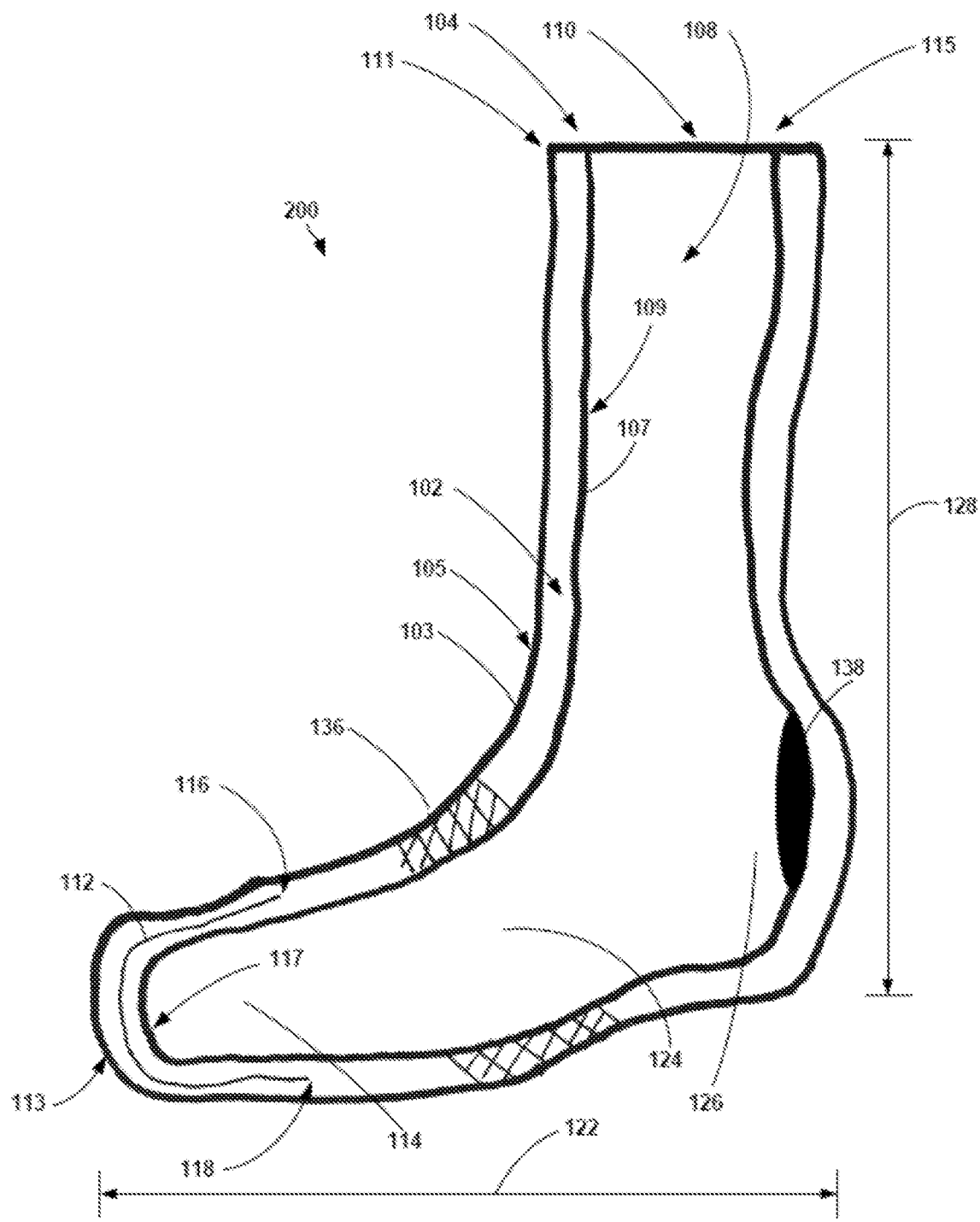
FIG. 4 shows a side cross-section view of a wearable garment, as described in Example 9.
Figure 5:
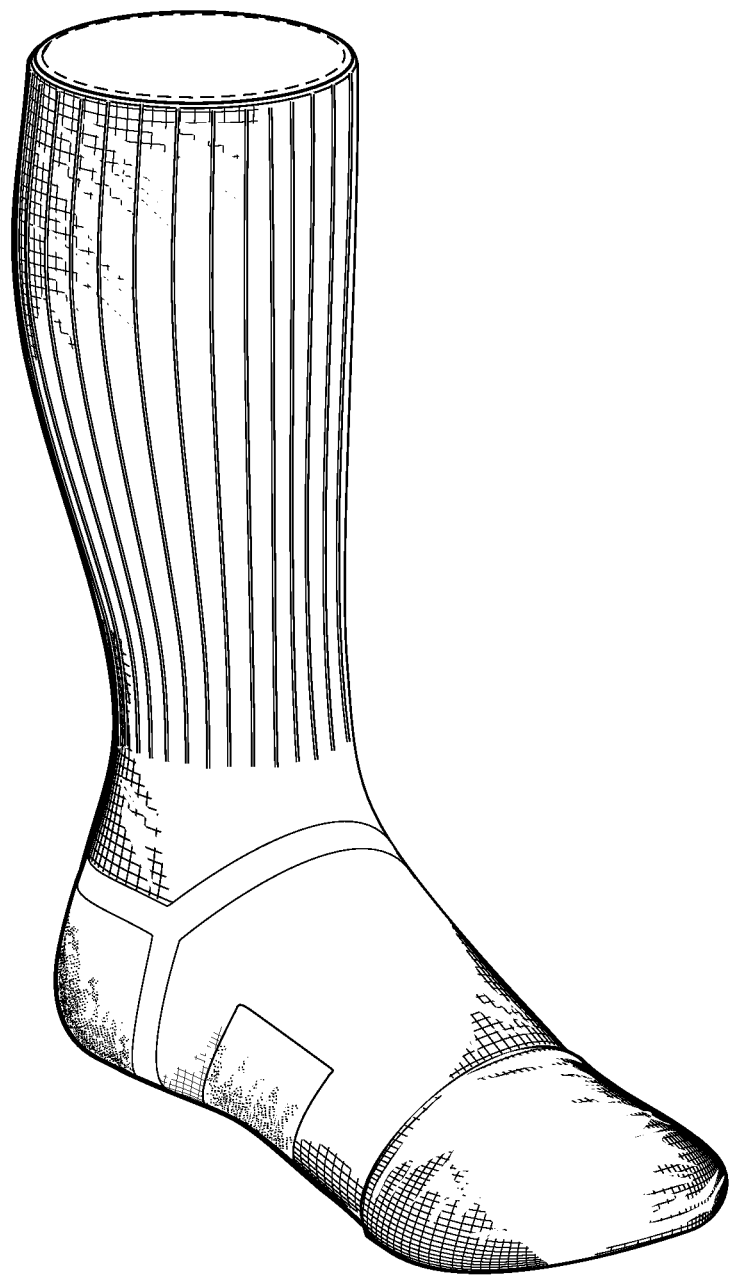
FIG. 5 shows another view of a wearable garment.
Figure 6:
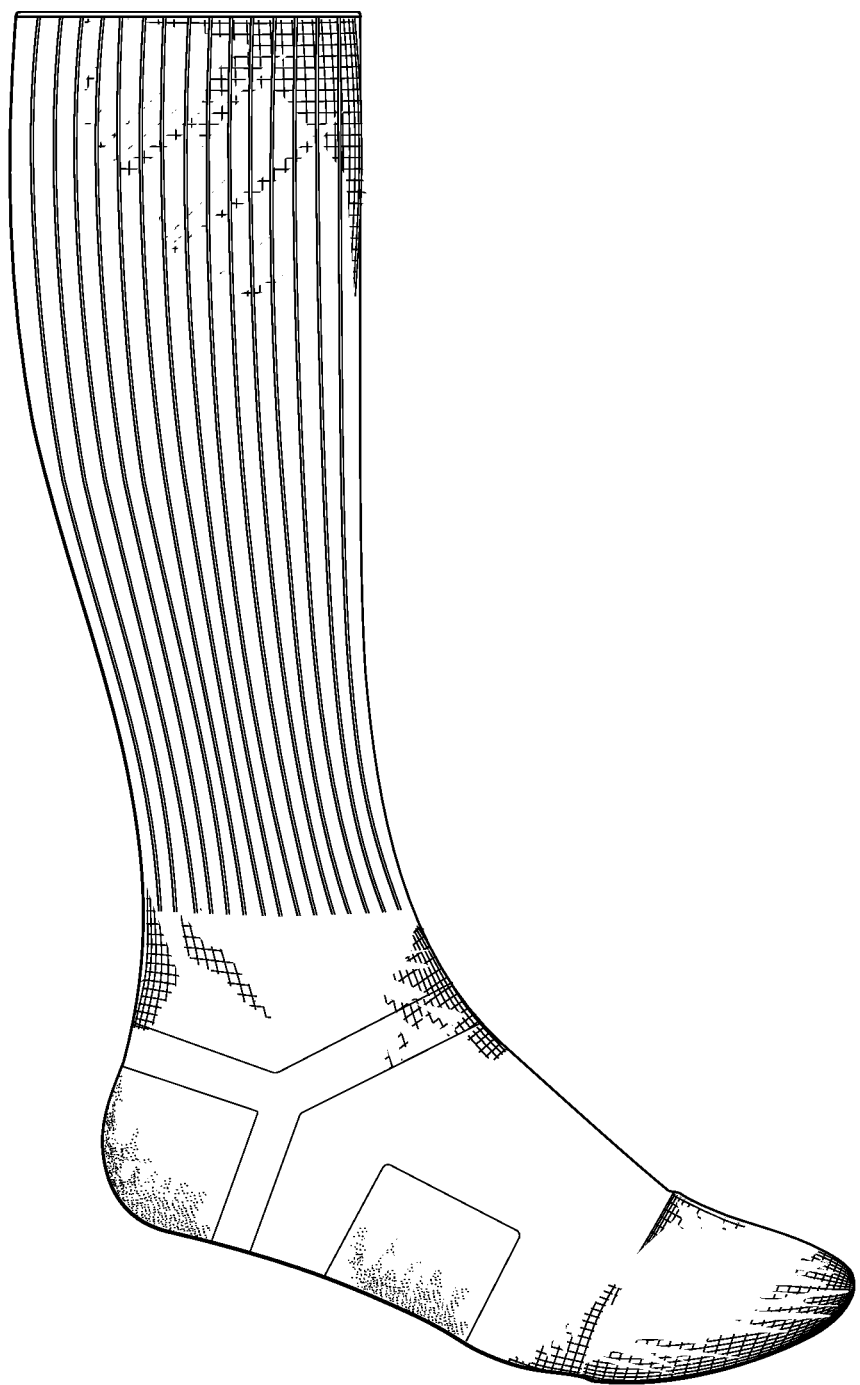
FIG. 6 shows another view of a wearable garment.
Figure 7:
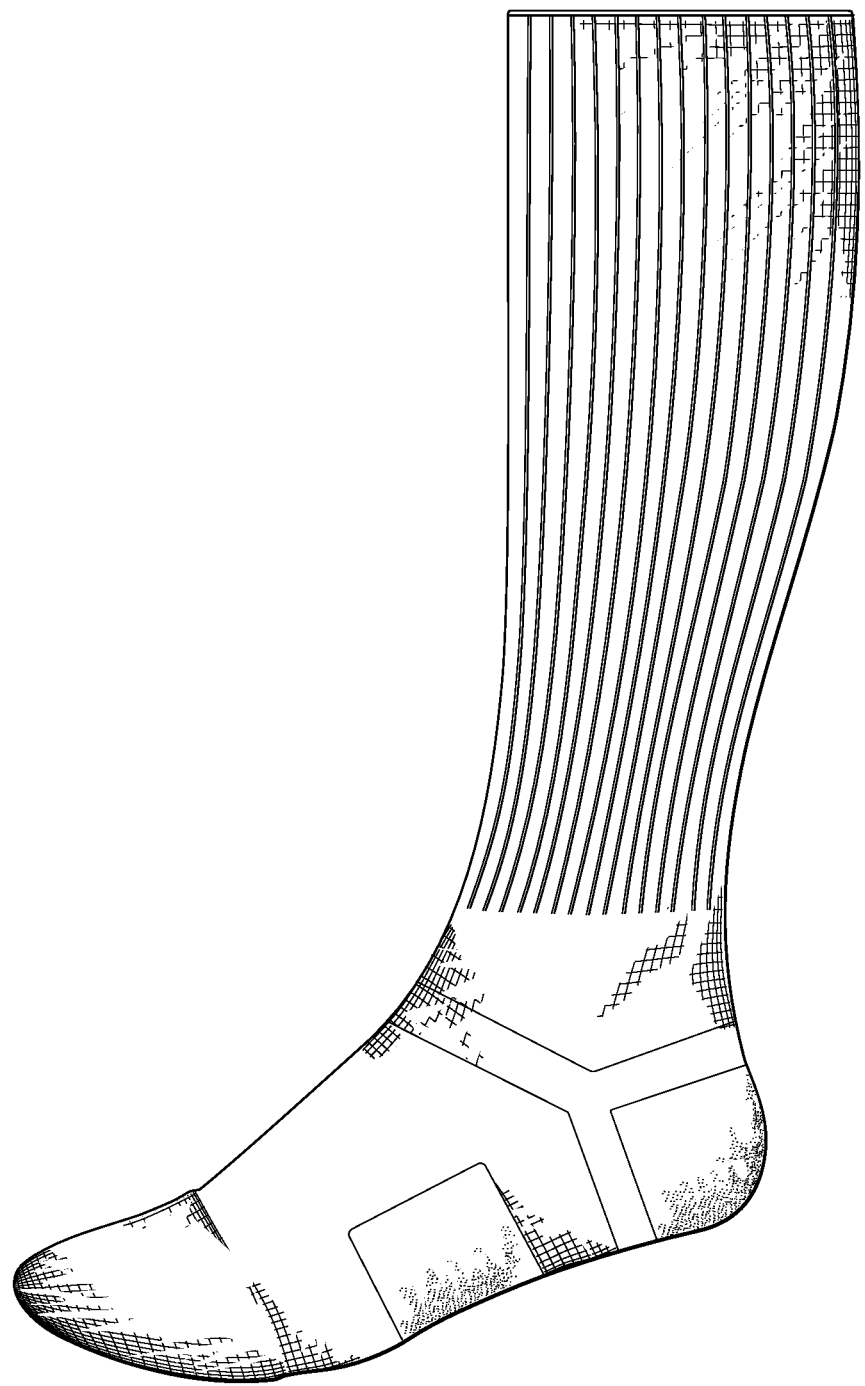
FIG. 7 shows another view of a wearable garment.
Figure 8:
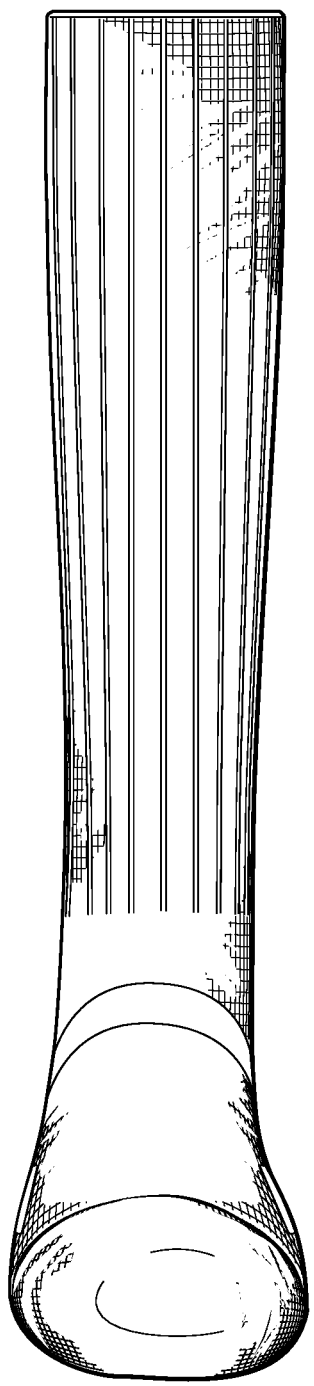
FIG. 8 shows another view of a wearable garment.
Figure 9:
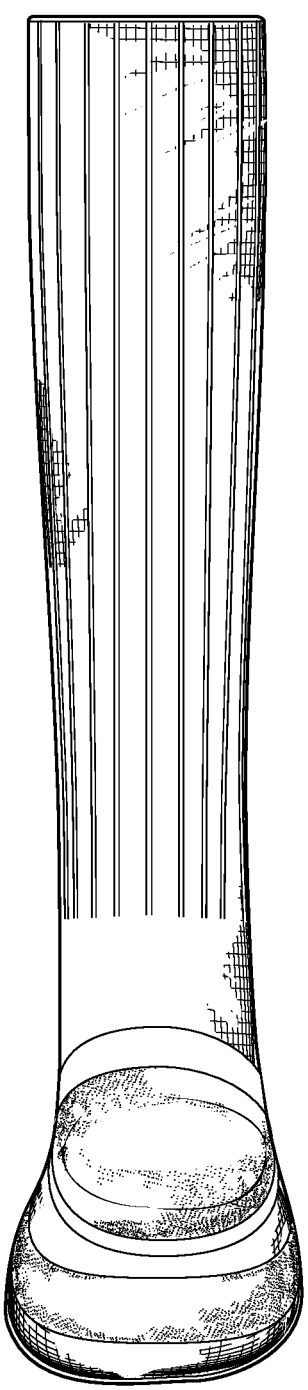
FIG. 9 shows another view of a wearable garment.
Figure 10:
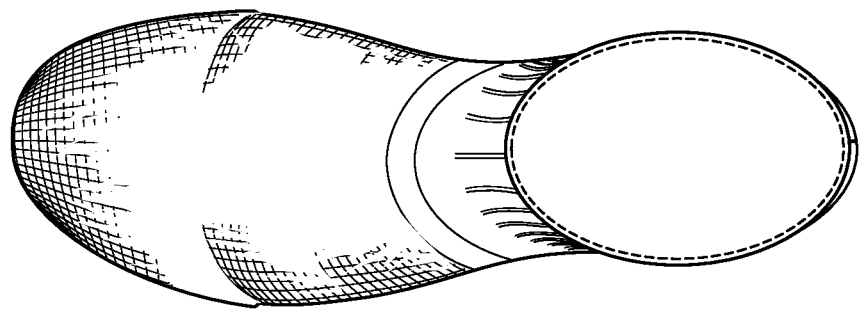
FIG. 10 shows another view of a wearable garment.
Figure 11:
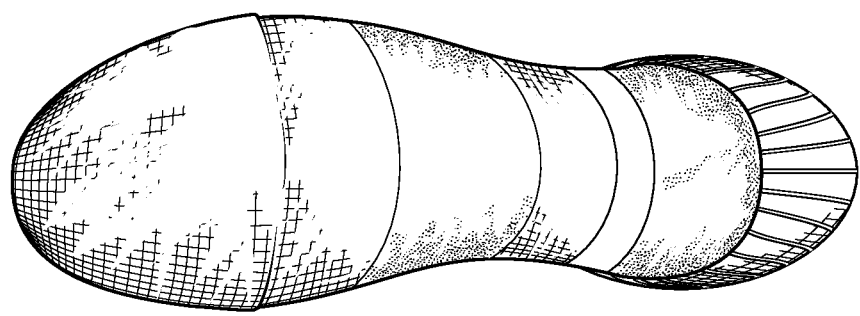
FIG. 11 shows another view of a wearable garment.

In another embodiment of the invention, as shown in FIG. 4, the present disclosure provides a sock 200 for preventing fungus transfer from the sock 200 to a user. The sock 200 can include any of the embodiments described above in relation to Examples 1-8. The sock 200 comprises a sheath 102 having a first end 104 and a second end 106. The sheath 102 defines a cavity 108 in a wearable position, and the sheath has an opening 110 at the first end 104 and the second end 106 of the sheath 102 is closed such that the sheath 102 is configured to cover the toes of the user in the wearable position. The sheath 102 comprises a first layer 103 positioned on an exterior surface 105 of the sheath 102 and a second layer 107 positioned on an interior surface 109 of the sheath 102. In such an example, the antifungal barrier 112 is positioned at the second end 106 of the sheath 102 between the first layer 103 and the second layer 107.

In one example, the first layer 103 and the second layer 107 both comprise the same material, and the antifungal barrier 112 comprises a material that is different than the material of the first and second layers 103, 107 of the sheath 102. In another example, the first layer 103 comprises a material that is different than the material of the second layer 107. The material of the first layer 103 of the sheath 102 and the material of the second layer 107 of the sheath 102 can be, for example but not limited to, a breathable matrix, a cotton material, Polytetrafluoroethylene (PTFE), polyester, an elastic material, a textile material, other materials, or a combination thereof. The textile material can be, for example but not limited to, cotton, polyester, polyvinyl chloride (PVC), keratin fibers, wool, spandex, tencel, acrylic, bamboo fiber, flax, lyocell, rayon, cellulosic acetates, wool, and/or an elastic polyurethane fiber.

In one example, the material of the second layer 107 can further comprise a yarn comprising copper, copper oxide, silver, and/or silver oxide particles attached to the fibers thereof.

The material of the first and second layers 103, 107 can further include an anti-bacterial and/or anti-fungal material contained in the material. The anti-bacterial and/or anti-fungal material can be, for example but not limited to, ceramic magnetic powder, silver-ion, zinc-ion, potassium-ion copper-oxide, calcium-ion, titanium-dioxide, triclosan, chloroxylenol, chitosan and/or quaternary ammonium compounds.

The material of the first layer 103 can be a compressive material that provides a compressive force when in use. In one particular example, the material of the first layer 103 comprises cotton or wool with an elastic polyurethane fiber, and the material of the second layer 107 comprises cotton, an elastic polyurethane fiber, and/or copper yarn. Other examples are possible as well.

The material of the first and second layers 103, 107 can include, for example but not limited to, cotton, polyester, polyvinyl chloride (PVC), keratin fibers, wool, Spandex™, pure nylon, Tencel, acrylic, bamboo fiber, flax, lyocell, rayon, cellulosic acetates and/or COOLMAX™. Cellulosic fibers and synthetic fibers are suitable materials for the sock 200. As discussed above, anti-bacterial and/or anti-fungal materials such as ceramic magnetic powder, silver-ion, zinc-ion, potassium-ion copper-oxide, calcium-ion, titanium-dioxide, triclosan, chloroxylenol, chitosan and/or quaternary ammonium compounds can also be incorporated with the material for reducing bad odor and eliminating bacteria and fungus. The material can be woven or knitted to form the a sock 200 to ensure good breathability. One construction design for the sock 200 is a toe sock. In a toe sock, each individual toe is individually encased by the material, and this would increase contact surface area for the antifungal barrier 112 and the skin of the foot. These features provide good moisture management which is an important element for successfully treating the fungal infection. Moisture management of socks is different from that of sportswear or active wear as the environment is occlusive. Moisture management reduces microbial overgrowth for patients.

In one particular example, the material of the second layer 107 includes cotton, elastin, and is further copper or silver infused. Such a material not only prevents bacteria and fungus, but it also creates a gliding effect between the skin of the user and the antifungal barrier 112, thus preventing blistering and moisture entrapment. In addition, the material of the second layer 107 promotes fresh air entrance to the toe part of the sock 200 to the antifungal barrier 112, thus preventing excessive sweating.

The material of the antifungal barrier 112 comprises silicone, neoprene, fluoroelastomer, fluorosilicone, plastisol inks, a gel, a polymer, a polyurethane foam, plastic, polyurethane, a liquid or sprayable rubber, or a combination thereof. The material of the antifungal barrier 112 can be selected such that the antifungal barrier 112 is waterproof.

The first layer 103 has a first end 111 and a second end 113, and the second layer 107 also has a first end 115 and a second end 117. The first end 111 of the first layer 103 is coupled to the first end 115 of the second layer 107 to thereby form the opening 110 at the first end 104 of the sheath 102. The antifungal barrier 112 is positioned between the first layer 103 and the second layer 107 at the second ends 113, 117 of the first and second layers 103, 107. The antifungal barrier 112 can extend from the second ends 113, 117 of the first and second layers 103, 107 towards the first end 104 of the sheath 102 at a length ranging from about 6 cm to about 8 cm measured from the second end 113 of the first layer 103 to the bottom surface end 118 of the antifungal barrier 112.

The first layer 103 can have a thickness of about 21 thread count, the second layer 107 can have a thickness of about 32 thread count, and the antifungal barrier 112 can have a thickness ranging from about 1 mm to about 1.5 mm.

The material of the first and second layers 103, 107 can further have an elastic property such that the sheath 102 is configured to expand to receive an appendage of a user (such as a foot), and thereafter retract to conform to the appendage to thereby hold the sock 200 in place on the appendage.

The second end 106 of the sheath 102 can be closed such that the sheath 102 is configured to cover the toes of a user when the sock 200 is in use. In such an example, the antifungal barrier 112 covers a desired portion of a toe section 114 of the sheath 102, with the desired portion fixed by an antifungal barrier top surface end 116 and bottom surface end 118. The antifungal barrier 112 further comprises an antifungal barrier outer surface 119 and inner surface 120 forming to the toe section 114.

In one example, the antifungal barrier 112 is positioned on an interior surface of the sheath 102, such that the antifungal barrier outer surface 119 layers against the inner surface of the sheath 102 with the antifungal barrier inner surface 120 layering against a patient's toes/toenails. In another example, the antifungal barrier 112 is positioned on an exterior surface of the sheath such that the antifungal barrier outer surface 119 layers against the patient's shoes with the antifungal barrier inner surface 120 layering against the outer surface of the sheath 102.

FIG. 4 further illustrates the traditional structures of a sock 200 such as a foot section 122, a sole section 124, a heel section 126, a leg section 128, and the opening 110. In one embodiment, the antifungal barrier 112 forms to the toe section 114 connecting to the foot section 122 which comprises the sole section 124 and the heel section 126 connecting to the leg section 128 that provides the opening 110 enabling the insertion of a foot. The foot section 122 can range in length from about 22 cm to about 28 cm, and the leg section 128 can range in length from about 3 cm to about 38 cm.

In another embodiment of the invention, FIG. 3 shows that the antifungal barrier 112 can be a silicone layer 130 that acts as a protective layer. The silicone layer 130 can be positioned as the antifungal barrier 112 in any of the embodiments described above in Examples 1 and 2. In one form, the silicone layer 130 integrates and embeds an infused antifungal remedy 132, either medicated or natural. In one particular example, the antifungal barrier 112 is infused with an infused substance 132. As used herein, the antifungal barrier is "infused" with the infused substance 132 when the antifungal barrier 112 is soaked in the infused substance 132 to thereby extract the properties of the infused substance 132. In one example, the infused substance 132 can comprise an antifungal medication, such as for example but not limited to, tea tree oils and eucalyptus oils as examples. The infused substance 132 can be about 2-3% infusion, meaning the infused substance 132 comprises 2-3% concentration of tea tree oil or eucalyptus oil, as examples. In addition to providing anti-bacterial and/or anti-fungal effect, the antifungal medication can provide a pleasant smell effect. In another example, the infused substance 132 can comprise an oil infused silicone (e.g., tea tree oils and eucalyptus oils) that provide a moisturizing and antifungal therapeutic effect to dry skin. In another embodiment, the antifungal barrier 112 provides a moisturizing and antifungal therapeutic effect to dry skin simply due to the silicone material of the antifungal barrier 112.

In another embodiment of the invention, the sheath 102 includes a compressive band 136 positioned between the antifungal barrier 112 and the first end 104 of the sheath 102. Such a compressive band 136 can be used in any of the embodiments described above in Examples 1-4. In particular, the compressive band 136 can comprise a compressive support at the arch of the foot. The compressive band 136 can be positioned between the toe section 114 and the heel section 126. The compressive band 136 can be about 5 cm in length. The compressive band 136 can help ensure a non-slip effect when the sock 200 is in use.

In another embodiment of the invention, an interior surface of the sheath 102 includes a heel region 138 comprising silicone, neoprene, fluoroelastomer, fluorosilicone, plastisol inks, a gel, a polymer, a polyurethane foam, plastic, polyurethane, a liquid or sprayable rubber, or a combination thereof. In such an example, the heel region 138 is positioned in the heel portion 126 and is configured to prevent the sock 200 from slipping when in use. Such a heel region 138 can be used in any of the embodiments described above in Examples 1-5.

In another embodiment of the invention, the antifungal barrier 112 comprises a heel cap configured to cover a heel of a user. Such an antifungal barrier 112 can replace the antifungal barrier 112 described above in relation to FIGS. 1-3 and Examples 1-6, or the heel cap antifungal barrier can be in addition to the antifungal barrier 112 positioned over the toes of the user. In another embodiment of the invention, the antifungal barrier 112 comprises an arch support configured to cover an arch of a foot of a user. Such an antifungal barrier can replace the antifungal barrier 112 described above in relation to FIGS. 1-4, or the arch support antifungal barrier can be in addition to the antifungal barrier 112 positioned over the toes of the user and/or the antifungal barrier positioned over the heel of the user.

In addition to the anti-bacterial and anti-fungal properties of the antifungal barrier 112 described above, the antifungal barrier 112 can also provide other benefits to the user. In particular, the antifungal barrier 112 provide shock absorption while the sock 200 is in use, thereby providing wound, calluses, and or neuroma prevention over bony prominences of the foot to help prevent medical conditions including blisters, calluses, bunions, hammer toes, mallet toes, fat pad atrophy over the metatarsal heads in the ball of the foot, and/or wounds. These medical conditions can cause significant discomfort on ambulation and walking in shoes or without, in all types of patient population. In particular, these medical conditions in diabetics can cause severe morbidity such as ulceration and blistering over pressure points with or without previous callus formation, and high chance of potential foot amputation, as a diabetic foot looses protective sensation and wound healing due to poor circulation and high blood sugar is extremely difficult and costly to treat. As such, the antifungal barrier 112 not only protects from cross contamination in the shoe, but provides a shock absorption and friction eliminating effect in the shoe, as well as a fungal and bacterial contamination barrier.

Example 10

Method of Preventing Fungal Growth in a Petri Dish

A fungal nail infection occurs from the overgrowth of fungi in, under, or on the nail. Fungi thrive in warm, moist environments. The same fungi that cause jock itch, athlete's foot, and ringworm can cause nail infections. According to the American Academy of Dermatology (AAD), fungal infections affect toenails more commonly than fingernails because toes are usually confined to shoes, where the environment is optimal for fungal growth. To determine the effectiveness and efficiency of the wearable garment of the instant invention to prevent the transfer of "fungus", in vitro experiments were conducted as follows.

Preparation of Sabouraud Dextrose Agar (SDA) Media (SDA) is a selective medium used for the isolation of dermatophytes, fungi, and yeasts. At an acidic pH (~5.0), SDA inhibits the growth of bacteria but permits the growth of yeasts and most filamentous fungi. The SDA media is comprised of enzymatic digest of casein and animal tissues which provide a nutritious source of amino acids and nitrogenous compounds for the growth of fungi and yeasts.

Dextrose, a fermentable carbohydrate, is incorporated in high concentration as a carbon and energy source, and agar acts as the solidifying agent. Antibiotics such as Chloramphenicol and/or tetracycline act as broad spectrum antimicrobials to inhibit the growth of a wide range of gram-positive and gram-negative bacteria. Gentamicin is then added to further inhibit the growth of gram-negative bacteria.

Composition of the SDA media: mycological peptone (enzymatic digest of casein and animal tissues)—10 gm/L; dextrose—40 gm/L; agar—15 gm/L. The pH of the media is adjusted to 5.6, and then poured into four Petri dishes which are kept at 250° C.

Specimen Processing

One of the fungal species listed in Table 1 was selected and streaked onto two of the four Petri dishes containing the SDA medium with a sterile inoculating loop in order to obtain isolated colonies. Following inoculation, the Petri dishes were incubated at 25-30° C. in an inverted position (agar side up) with increased humidity. Cultures were examined at least weekly for fungal growth and are held for 2-6 weeks before being reported as negative.

TABLE 1

Fungal Species

*Trichophyton rubrum*
*Trichophyton interdigitale*
*Epidermophyton floccosum*
*Trichophyton violaceum*
*Microsporum gypseum*
*Trichophyton tonsurans*
*Trichophyton soudanense*

Figure 12:
FIG. 12 shows two inoculated Petri dishes with isolated colonies in streaked areas and confluent fungal growth in areas of heavy inoculation, as described in Example 10.
Figure 12:
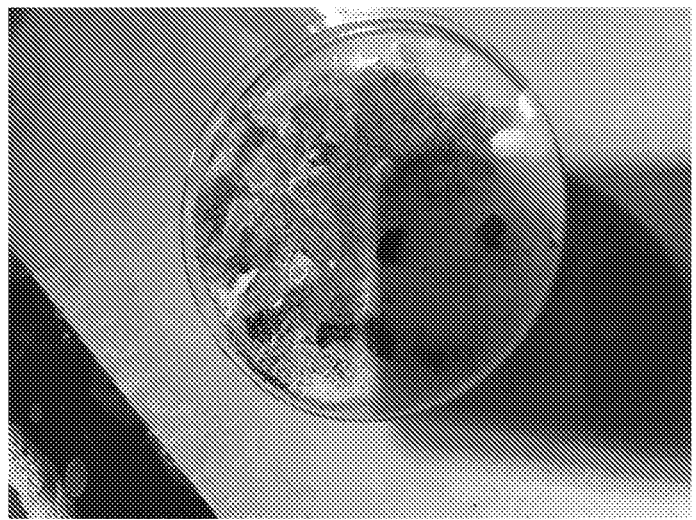

After sufficient incubation, the two inoculated Petri dishes showed isolated colonies in streaked areas and confluent growth in areas of heavy inoculation (see FIGS. 12A and B). Petri dishes have been examined for fungal colonies exhibiting typical color and morphology and a KOH test is used to proof the fungal media.

Detection of Fungi Transfer

The first Petri dish containing fungal colonies was covered with a control garment that is in direct contact with the colonies and a second Petri dish that tested negative for fungal colonies was placed atop the control garment, agar side up, in a "sandwich" configuration. This experimental design acted as a control to determine fungal transfer from the first Petri dish to the second Petri dish via the control garment. Alternatively, sterile media agar of the same composition as described above was place inside the control garment and the first Petri dish containing fungal colonies was covered with the control garment that was in direct contact with the colonies.

In a second experimental design, the control garment was replaced with the wearable garment of the instant invention. The wearable garment was in direct contact with the fungal culture on the first Petri dish. Alternatively, sterile media agar of the same composition as described above was place inside the wearable garment and the first Petri dish containing fungal colonies was covered with the wearable garment that was in direct contact with the colonies.

Both the control garment, the wearable garment, and the Petri dish "sandwiches" were incubated at 26-30° C. and periodically sprayed with water to ensure moist environment. Over a period of 2-6 weeks, pictures of the "sandwiches" were periodically obtained and the second Petri dish and the agar media from inside the control and wearable garments were analyzed for fungal colonies. The regular garment from the control experiment and the wearable garment from the second experiment were sent to the lab for report of fungal growth.

Example 11

Method of Preventing Fungus Transfer to a User

In another embodiment, the present disclosure provides a method of preventing fungus transfer to a user. In particular, the method includes positioning the wearable garment 100 of any one of the examples described herewith on a foot of the user, or positioning the sock 200 of any one of the examples described herewith on a foot of the user. The method prevents toe/toenail fungus without the recurrence of such infections when exposed to contaminated environments such as wearing shoes before, during, throughout, or after medical treatment. The design of the wearable garment 100 and sock 200 enables a user to wear the wearable garment 100 or sock 200 for daily use. Additionally, the protective silicone and/or gel layer(s) of the wearable garment can be infused with antifungal medicated or natural remedies such as tea tree oil, to further assist in prevention of fungus transfer to the user. Along with the protective layer(s) being waterproof and a complete barrier between toes and shoes, this optional remedy infusion feature provides a moisturizing and antifungal therapeutic effect to dry skin. In another embodiment, the antifungal barrier 112 provides a moisturizing and antifungal therapeutic effect to dry skin simply due to the silicone material of the antifungal barrier 112.

While various aspects and embodiments have been disclosed herein, other aspects and embodiments will be apparent to those skilled in the art. All embodiments within and between different aspects of the invention can be combined unless the context clearly dictates otherwise.

The various aspects and embodiments disclosed herein are for purposes of illustration and are not intended to be limiting, with the true scope and spirit being indicated by the following claims.

What is claimed is:

1. A sock for preventing fungus transfer to a user, the sock comprising a sheath having a first end and a second end, wherein the sheath defines a cavity in a wearable position, wherein the sheath has an opening at the first end and the second end of the sheath is closed such that the sheath is configured to cover the toes of the user in the wearable position, and wherein the sheath comprises a first layer positioned on an exterior surface of the sheath and a second layer positioned on an interior surface of the sheath,
   wherein an antifungal barrier is positioned at the second end of the sheath between the first layer and the second layer of the sheath;
   wherein the antifungal barrier is configured to cover upper and lower portions of the toes of the user;
   wherein the sheath comprises a first material;
   wherein the antifungal barrier comprises a second material that is different than the first material;
   wherein the antifungal barrier is removably coupled to the first material;
   wherein the antifungal barrier is waterproof; and
   wherein the antifungal barrier further provides shock absorption while the sock is in use, thereby providing wound, calluses, and/or neuroma prevention over bony prominences of the foot to help prevent medical conditions including blisters, calluses, bunions, hammer toes, mallet toes, fat pad atrophy over the metatarsal heads in the ball of the foot, and/or wounds.

2. The sock of claim 1, wherein the first layer and the second layer of the sheath both comprise the same material, and wherein the antifungal barrier comprises the second material that is different than the material of the first and second layers of the sheath.

3. The sock of claim 1, wherein the first layer and the second layer comprise different materials.

4. The sock of claim 3, wherein the material of the second layer includes cotton, elastin, and is further copper or silver infused.

5. A method comprising wearing the sock of claim 1.

6. The sock of claim 1, wherein the antifungal barrier comprises a toe cap configured to cover the toes of the user.

7. The sock of claim 1, wherein the antifungal barrier is infused with an antifungal medication.

8. The sock of claim 1, wherein the first material comprises a breathable matrix, a cotton material, Polytetrafluoroethylene (PTFE), polyester, an elastic material, a textile material comprising cotton, polyester, polyvinyl chloride (PVC), keratin fibers, wool, spandex, tencel, acrylic, bamboo fiber, flax, lyocell, rayon, and cellulosic acetates, wool, an elastic polyurethane fiber, or a combination thereof.

9. The sock of claim 1, wherein the first material further comprises a yarn comprising copper, copper oxide, silver, and/or silver oxide particles attached to the fibers thereof.

10. The sock of claim 1, wherein the second material comprises silicone, neoprene, fluoroelastomer, fluorosilicone, plastisol inks, a gel, a polymer, a polyurethane foam, a plastic, a polyurethane, a liquid or sprayable rubber, or a combination thereof.

* * * * *